United States Patent [19]

Rezag et al.

[11] Patent Number: 5,074,496
[45] Date of Patent: Dec. 24, 1991

[54] SYSTEM FOR SUPPLYING AN ENCLOSURE WITH TROLLEYS OR SIMILAR

[75] Inventors: André Rezag, Blagnac; Antoine Ferretti, Toulouse, both of France

[73] Assignee: Aerospatiale Societe Nationale Industrielle, Paris, France

[21] Appl. No.: 651,126

[22] Filed: Feb. 6, 1991

[30] Foreign Application Priority Data

Feb. 19, 1990 [FR] France .................... 90 01967

[51] Int. Cl.$^5$ .......................... B64D 11/04; B61D 1/06
[52] U.S. Cl. ................................ 244/118.1; 244/118.5; 105/327; 414/392; 414/399
[58] Field of Search ................... 244/118.1, 118.5; 105/327; 414/282, 399 X, 392 X; 186/40, 51

[56] References Cited

U.S. PATENT DOCUMENTS

| Re. 32,176 | 6/1986 | Vernon | 244/118.5 |
| 4,055,317 | 10/1977 | Greiss | 244/118.5 |
| 4,660,787 | 4/1987 | Sprenger et al. | 244/118.5 |
| 4,804,307 | 2/1989 | Motoda | 414/282 |

FOREIGN PATENT DOCUMENTS 2537543 of 1983 France .
2131779 of 1984 United Kingdom .

Primary Examiner—Joseph F. Peters, Jr.
Assistant Examiner—Virna Lissi Mojica
Attorney, Agent, or Firm—Fisher, Christen & Sabol

[57] ABSTRACT

A system is disclosed for supplying an enclosure with trolleys or similar, provided more particularly in the passenger cabin of an aircraft and comprising:

at least one storage container in which said trolleys are arranged and which is situated in the baggage compartment of said aircraft;

a controllable automatic device provided in the baggage compartment of said aircraft and able to move to seize each of said trolleys in said container, by gripping means, and then bring it to said enclosure via a passage formed between the baggage compartment and said enclosure; and a programmable control unit connected to said automatic device and containing the information relative to the position of said trolleys in the container and to the types of products contained in each of them so that, depending on the information transmitted by said unit, said automatic device moves for seizing said corresponding trolley and bringing it from the baggage compartment to said enclosure.

14 Claims, 6 Drawing Sheets

SYSTEM FOR SUPPLYING AN ENCLOSURE WITH TROLLEYS OR SIMILAR

BACKGROUND OF THE INVENTION

The present invention relates to a system for supplying an enclosure with trolleys or similar.

Although not exclusively, the system according to the invention is more particularly intended to be installed in aircraft for supplying trolleys, containing meal trays, drinks, reviews, etc. ... and initially stored in the baggage compartment of the aircraft, into an enclosure situated in the passenger cabin of said aircraft. Such a system could of course be mounted on board freight planes for bringing trolleys containing equipment from the baggage compartment, where they are stored, to the upper deck.

Known systems are usually provided in the passenger cabin of the aircraft, the set of trolleys, containing particularly food products, being stored in cabinets situated in the passenger cabin close to one or more enclosures, such as galleys in which the kitchen equipment, the oven, the refrigerator, etc. ... are disposed, the aircrew thus being able to carry out different tasks such as heating dishes, the preparation of drinks and distribution of meal trays contained in the trolleys.

Although this type of arrangement is advantageous for the aircrew because of the proximity on the same level of the food storage trolleys and the galleys, on the other hand, such an arrangement occupies a considerable volume in the passenger cabin, to the detriment of the number of passenger seats.

In addition, to attempt to overcome this drawback and increase the number of seats and, consequently, improve the profitability of the aircraft, a solution has already been proposed which consists in fitting out part of the baggage compartment of the aircraft so as to house the food storage trolleys and the galleys therein. This solution has in particular been tried out on DC 10 aircraft by Mc Donnell Douglas.

Although this system optimizes the number of seats for transportable passengers, since the galleys and the storage trolleys are situated in the baggage compartment, it nevertheless has drawbacks particularly from the point of view of the numerous technical modifications to be made to the aircraft. In fact, besides fitting out a considerable part of the baggage compartment to the detriment then of the freight which can be carried, it is necessary to pressurize and air condition the part of the baggage compartment thus fitted out, to provide an access ladder between the baggage compartment and the passenger cabin and to install a lift for transferring the trolleys from the baggage compartment to the passenger cabin. Furthermore, the arrangement of the baggage compartment remains nevertheless very uncomfortable for the aircrew because of the low height of the compartment and the incessant coming and going between the baggage compartment and 'the passenger cabin.

Consequently, for these different reasons, this solution has not been taken up for other aircraft so that, at the present time, the trolleys containing particularly meal trays, drinks and reviews are stored in cupboards in the passenger cabin, close to the galleys.

SUMMARY OF THE INVENTION

The object of the present invention is to overcome these drawbacks and provides a system for supplying an enclosure with trolleys or similar, provided in the passenger cabin of an aircraft, which allows the number of seats for passengers in the aircraft to be increased without requiring appreciable modification thereof and contributes to improving the working conditions of the aircrew.

For this, the system for supplying an enclosure with trolleys or similar, provided particularly in the passenger cabin of an aircraft, is remarkable in accordance with the invention in that it comprises:
- at least one storage container in which said trolleys are arranged and which is situated in the baggage compartment of the aircraft;
- a controllable automatic device provided in the baggage compartment of the aircraft and able to move for seizing each of said trolleys in said container by gripping means, then bringing it to said enclosure via a passage formed between said baggage compartment and said enclosure; and
- a programmable control unit connected to said automatic device and containing the information relative to the position of said trolleys in the container and to the types of products contained in each of them so that, depending on the information transmitted by said unit, said automatic device moves for seizing said corresponding trolley and bringing it from said baggage compartment to said enclosure.

Thus, the system according to the invention overcomes the drawbacks of the above described solutions. In fact, since the trolleys containing the meal trays, the drinks, the reviews, etc. ... are then stored in the baggage compartment,, additional seats may be installed in the cabin, considerably increasing the passenger transporting capacity of the aircraft. Furthermore, the enclosure, which is accessible to the aircrew, is advantageously kept at the level of the passenger cabin and facilitates the work of the staff. By operating the control unit, each member of the aircrew may thus choose the trolley which he needs corresponding, for example, to a specific type of meal tray, the trolley being brought automatically from the storage container to said enclosure by the automatic device.

Advantageously said automatic device is arranged in a container adjacent the container storing said trolleys, said passage formed between the baggage compartment and said enclosure emerging into the container carrying said automatic device.

Thus, fitting out of the baggage compartment of the aircraft raises no special problems, since the trolleys and the automatic device are arranged in respective containers corresponding advantageously to those used for transporting freight and luggage. Loading them into and unloading them from the baggage compartment, as well as fixing them to the structure of the baggage compartment, are easily carried out without particular adaptation, in the same way as freight transport containers.

In a preferred embodiment, said movable automatic device is formed:
- of a mount fixed to the base of said container and able to move with respect to the base along two axes X—X and Y—Y perpendicular to each other, said axis X—X being parallel to the longitudinal axis of the aircraft;
- of a bracket, extending said mount and able to pivot with respect to the mount about an axis of rotation R orthogonal to the plane formed by the axes X—X and Y—Y of the base, as well as to the longitudinal axis of the aircraft; and a lifting device, comprising said gripping means and mounted for pivoting about the bracket about an axis of rotation R1, parallel to the axis of rotation R of the bracket, said gripping means being slidable along an axis Z—Z parallel to the axes of rotation R and R1 and orthogonal to the plane formed by the axes X—X and Y—Y.

For example, said mount of the automatic device may be mounted on at least a first guide rail, corresponding to the axis X—X and along which the mount can move, said first guide rail being itself mounted for sliding on at least a second guide rail corresponding to the axis Y—Y and fixed to the base of said container. The conception of X—X and Y—Y movements of the automatic device by the orthogonal guide rails, which form a compound or cross table, guarantees reliable operation of the automatic device in use.

As for the lifting device of said automatic device, it may comprise a fixed part mounted for pivoting on the bracket about the axis of rotation R1 and a mobile part corresponding to said gripping means and slidable along the axis Z—Z by lifting means associated with the two parts. Here again, the mechanically simple design of the lifting device ensures in use reliable and sure operation of the automatic device.

Furthermore, said storage container preferably has a plurality of compartments, for receiving said trolleys and are aligned in a direction orthogonal to the longitudinal axis of said aircraft.

According to another characteristic of said system, said trolleys are advantageously housed in receptacles, each receptacle which contains a trolley being itself arranged in one of the compartments of said storage container while being able to be withdrawn from said compartment by the gripping means of the automatic device in a direction parallel to the longitudinal axis of the aircraft.

In a preferred embodiment, said receptacles have a parallelepipedic form corresponding to that of said compartments and each receptacle has a lateral opening through which the corresponding trolley may be inserted or removed.

Advantageously, each of said trolleys is immobilized in the corresponding receptacle by a swinging lever mechanism, mounted for pivoting on each receptacle and being applied against the lateral face of said trolley which closes the opening of the receptacle. When the transferred receptacle is situated in the enclosure, the aircrew removes the trolley from the receptacle after operating the lever mechanism. At this stage, the empty receptacle which is situated in the reception enclosure may be brought directly by the automatic device into its compartment or else said automatic device may wait until the products contained in the trolley have been distributed before bringing back the assembly formed by the receptacle and the trolley, then empty, into the compartment.

In addition, to allow the introduction of the corresponding bearing surface of said gripping means under the lower face of the receptacle, the base of each compartment on which the receptacle rests has a recess.

Furthermore, locking means lock in position the receptacle which has been chosen by the gripping means of said automatic device so that the receptacle carried by the gripping means can be transferred without difficulty.

In a preferred embodiment, said locking means are of the electromagnetic type and comprise metal plates fixed to the bearing surfaces of the gripping means and which are able to cooperate with metal plates situated correspondingly on the lower face and on the lateral face of each receptacle, opposite said lateral opening.

Furthermore, said receptacles are immobilized respectively in the compartments of said container by releasable locking means. For this, said locking means may be associated with the lower face of each receptacle and comprise at least one box with a mechanism with two movable rods cooperating perpendicularly with each other by means of an inclined ramp, one of the ends of a rod projecting from the lateral face of the receptacle, turned towards said automatic device and opposite the opening, and one of the ends of the other rod being engaged in the dividing wall separating two adjacent compartments while immobilizing said receptacle in the container so that, under the action of the gripping means of the automatic device, the projecting end of said rod penetrates into said box whereas, simultaneously, the end of the other rod, under the action of a return spring, clears itself from the dividing wall thus releasing the receptacle from the corresponding compartment of said container.

To facilitate sliding of the receptacles with respect to the compartments, each receptacle is mounted on running tracks connected to the base of each of the compartments. According to another characteristic of said system, said programmable control unit comprises, for example, a micro-computer situated in the enclosure receiving said trolleys.

BRIEF DESCRIPTION OF THE DRAWINGS

The figures of the accompanying drawings will better show how the invention may be put into practice. In these figures, identical references designate similar elements.

DESCRIPTION OF THE PREFERRED EMBODIMENT

Figure 1:
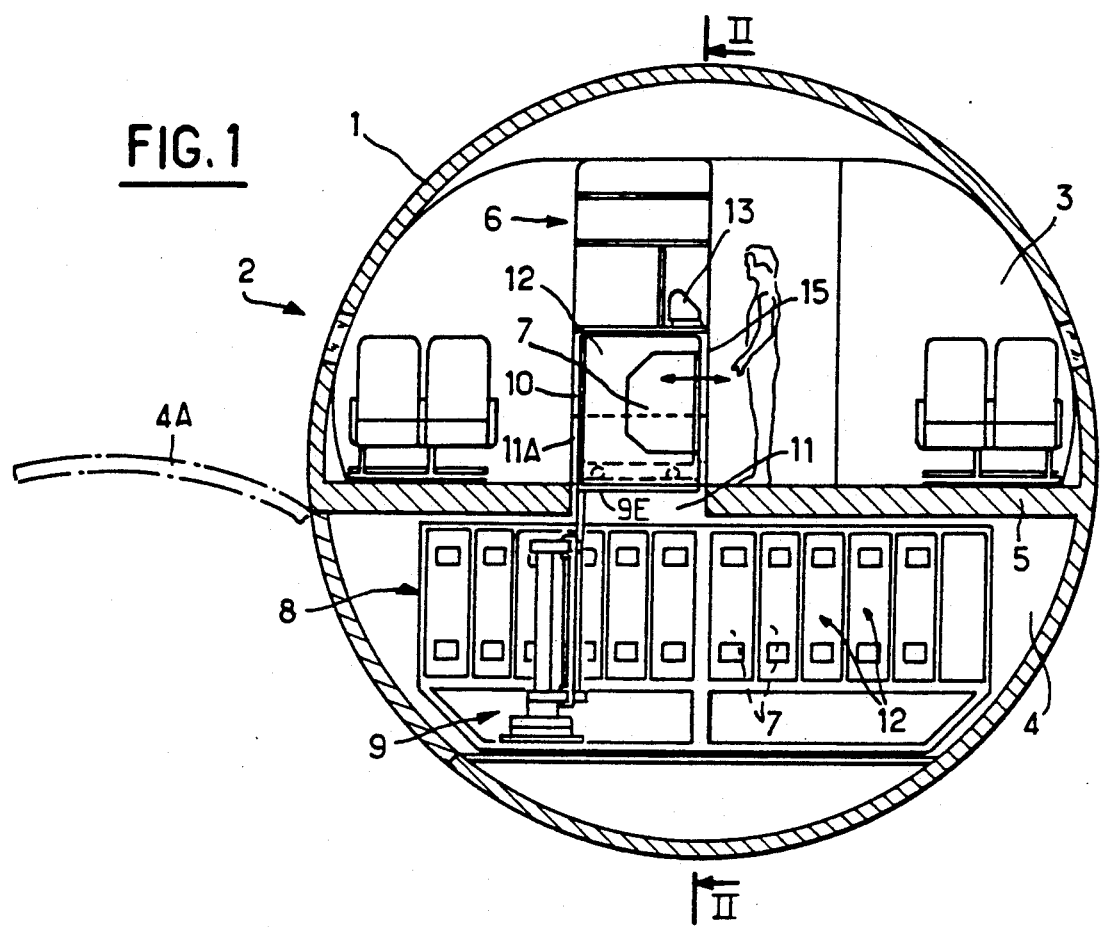
FIG. 1 is a schematic cross sectional view of the fuselage of an aircraft, in which the system of the invention is arranged for supplying an enclosure provided in the passenger cabin with trolleys stored in containers situated in the baggage compartment of said aircraft.
Figure 2:
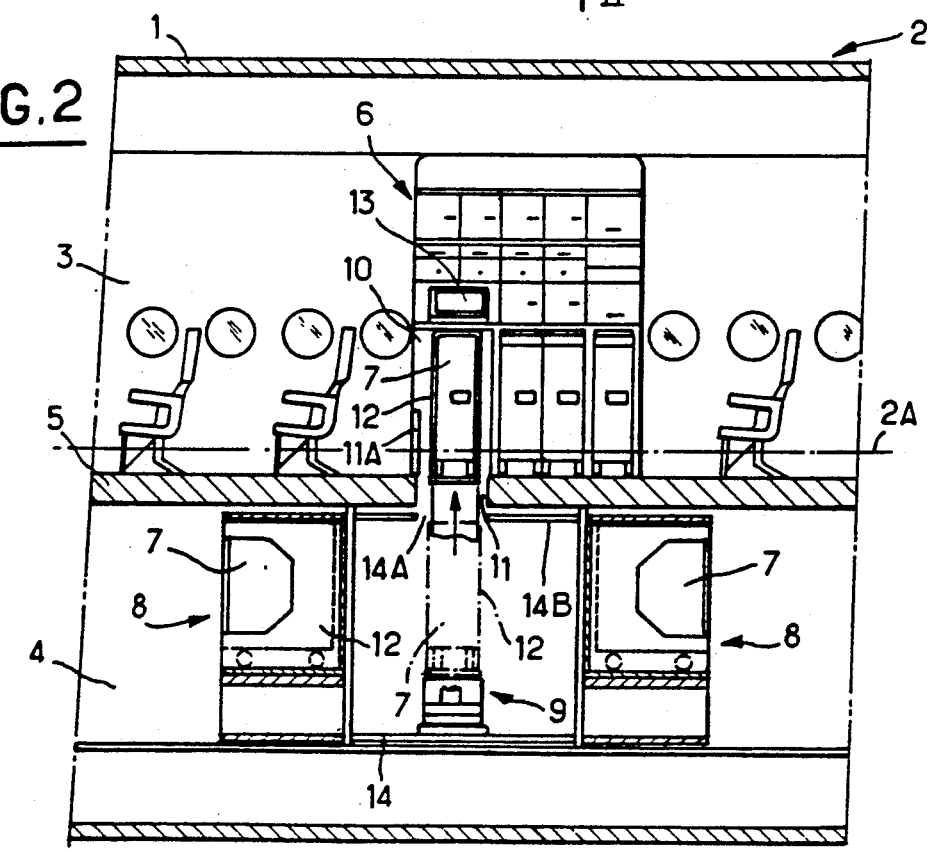
FIG. 2 is a longitudinal sectional view of the fuselage of the aircraft, through line II—II of FIG. 1, and showing the arrangement of said system in the fuselage of the aircraft.

Referring to FIGS. 1 and 2, the fuselage 1 of the aircraft, shown schematically, comprises two separate zones, namely an upper zone corresponding to the passenger cabin 3 and a lower zone corresponding to the baggage compartment 4 receiving freight and luggage. Cabin 3 is separated from the baggage compartment 4 by a floor 5.

The system according to the invention is used for supplying an enclosure 6, situated in the passenger cabin 3, with trolleys 7 which contain for example meal trays, drinks, reviews, etc...The enclosure 6 corresponds to a galley usually provided in cabin 3 and which comprises the cooking equipment required for the aircrew to carry out the different tasks of service.

The system comprises, in the embodiment illustrated, two identical containers 8 which are situated in the baggage compartment 4 of aircraft 2 and in which the trolleys 7 are stored. A controllable automatic device 9 is provided in the baggage compartment and it is able to move for seizing said trolleys 7 one by one, by gripping means, which are housed in each container for bringing them to a reception position 10 located in the galley 6, via a passage 11 formed in floor 5 between the baggage compartment 4 and the cabin 3, an access trap 11a being provided in passage 11. Advantageously, to facilitate the transfer of said trolleys 7 by the automatic device 9, they are housed in receptacles 12 which are themselves housed in the containers 8 and which will be more particularly described with reference to FIGS. 4 to 7. Thus, the automatic device seizes the receptacle containing the chosen trolley. The system also comprises a programmable control unit 13 connected to the automatic device 9 and containing the information relative to the position of the trolleys 7 stored in containers 8 and to the types of products contained in each trolley. The control unit 13 may for example be a microcomputer disposed in the galley 6.

Each member of the aircrew may obtain, by means of the microcomputer 13, the trolley he needs, the automatic device 9 which receives the information transmitted by the microcomputer 13 moving to seize the receptacle 12 containing the corresponding trolley and bring it from container 8 to the reception position 10 in galley 6.

In these FIGS. 1 and 2, a receptacle 12 has been shown containing a trolley 7, brought by the automatic device 9 into the reception position 10. At this stage, the aircrew, opening an access door 15 at position 10, may remove the trolley 7 from receptacle 12.

In FIG. 2, two containers 8 are disposed respectively on each side of the automatic device 9 which is advantageously arranged in container 14. Passage 11 then opens into container 14 through a hole 14a provided in its upper wall 14b. The cross section of passage 11 is of course larger than that of the receptacles 12 carrying trolleys 7.

Containers 8 and 14 used in the system are of standard type, similar to those usually used for transporting luggage and freight, so that the cost of installing the system in aircraft is considerably reduced.

Thus, the containers 8 and 14 can be arranged in the baggage compartment of the aircraft 2 without difficulty, loading and unloading thereof taking place in the same way as usual containers, for example, through a baggage compartment door 4A shown with a chain-dotted line in FIG. 1. Containers 8 and 14 are then fixed to the structure of the baggage compartment by mechanisms, not shown, but identical to those usually used.

Figure 3:
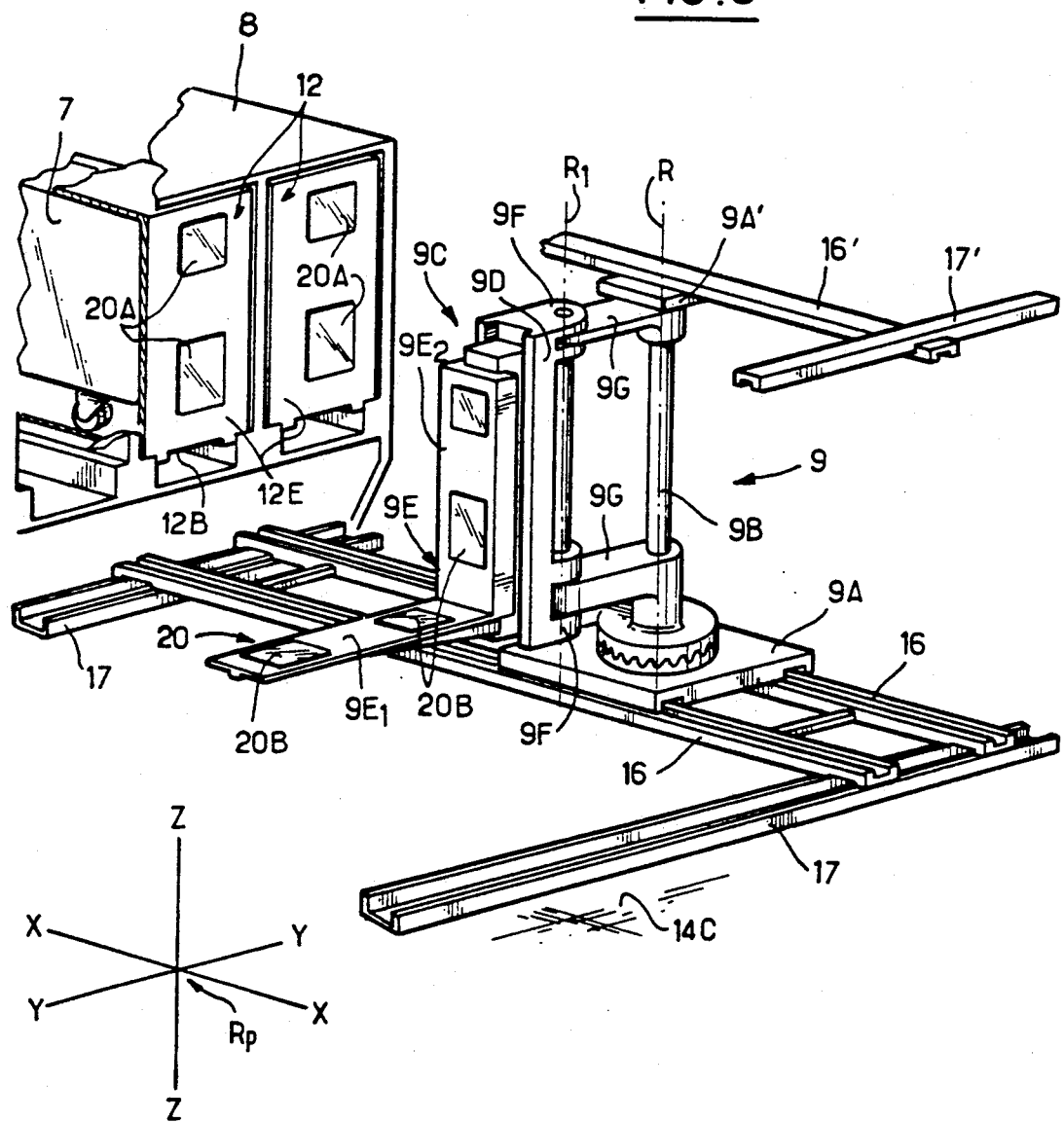
FIG. 3 is a perspective view of a preferred embodiment of the automatic device of said system, for transferring trolleys disposed in the containers in the baggage compartment towards the enclosure.

With reference to FIG. 3, the automatic device 9 comprises a mount 9A resting, in this embodiment, on two first identical guide rails 16 spaced apart and parallel to each other, which thus provides good stability of the automatic device. The mount 9A thereof may, by drive means not shown, move along rails 16 in a direction corresponding to the axis X—X of the reference system Rp, parallel to the longitudinal axis 2A of the aircraft 2 shown in FIG. 2. The ends of the two first guide rails 16 are mounted respectively on two second guide rails 17 parallel to each other and orthogonal to the first rails 16. These second guide rails 17 are fixed to base 14C of the container, opposite the upper wall 14B. Thus, the automatic device 9 may also move along rails 17, via rails 16 and drive means not shown, in a direction corresponding to axis Y—Y of the reference system Rp.

Mount 9A is extended by a bracket 9B which is mounted for rotation, with respect to mount 9A, about an axis of rotation R orthogonal to the plane formed by rails 16 and 17 and to the longitudinal axis 2A of the aircraft. Drive means not shown are provided for rotating the bracket about axis R. Moreover, the automatic device 9 also comprises a lifting device 9C mounted, in the embodiment illustrated, articulated to bracket 9B for rotation about an axis R1 parallel to axis R.

This lifting device 9c is formed of a fixed part 9D articulated to bracket 9B for rotation about axis R1 by fork joints 9F in which lugs 9G extending the bracket radially are engaged and a mobile part 9E which corresponds to the gripping means of said automatic device and which is intended to grip then bring each of the receptacles containing the trolleys from the containers 8 to galley 6.

Lifting means, not shown, are provided between the two parts 9D and 9E. Thus, the mobile part 9E corresponding to the gripping means is able to move along the direction, corresponding to axis Z—Z of the reference system Rp and parallel to axes R and R1.

These gripping means 9E comprise two bearing surfaces $9E_1$ and $9E_2$ orthogonal to each other and forming a dihedron. The bearing surface $9E_1$ is contained in a plane formed by the axes X—X and Y—Y, whereas the bearing surface $9E_2$ is parallel to axis Z—Z and orthogonal to the plane X—X and Y—Y corresponding to the base 14C of container 14.

As shown partially in FIG. 3, guide rails 16' and 17' may also be provided in the top part of container 14, identical to the preceding ones. Rails 17' are then fixed to the upper wall 14b of container 14, whereas rail 16' slides by its ends on rails 17'.

With the guide rails 16' is associated a mount 9A' of the automatic device, in which the other end of bracket 9B is journalled. Such mounting of the automatic device 9 in container 14 confers thereon excellent stability during its different movements.

In FIG. 3, one of the containers 8 is shown partially in which the receptacles 12 containing the trolleys 7 are stored, the receptacles 12 being able to be gripped by surfaces $9E_1$ and $9E_2$ of the gripping means and being disposed in the containers parallel to axis X—X.

Figure 4:
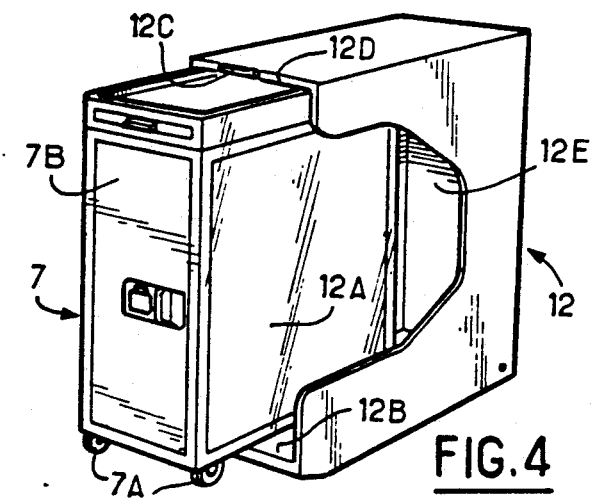
FIGS. 4 and 5 illustrate respectively front and rear perspective views of one of the receptacles in which a trolley is housed and which is to be introduced into a corresponding compartment of said container.
Figure 5:
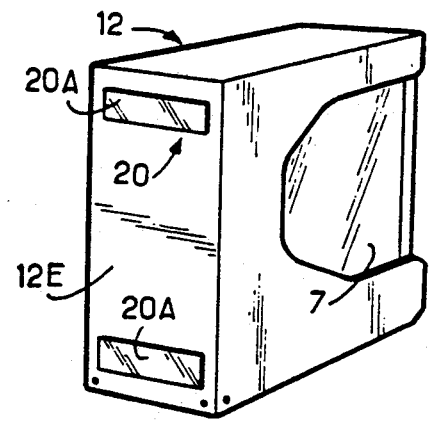

Referring to FIGS. 4 and 5, each receptacle 12 has a parallelepipedic shape while having a lateral opening 12A through which trolley 7 can be inserted or removed. Thus, it can be seen in FIG. 4 that each trolley 7 is perfectly inserted in receptacle 12, resting on its wheels 7A on the lower face 12B of the receptacle. The trolley 7 then inserted into the receptacle 12 is immobilized, for example, by a lever mechanism 12C mounted for pivoting on the upper edge 12D of the receptacle, defining the opening 12A. Each trolley 7, engaged in the enclosure, is immobilized therein when the level mechanism 12C is rocked, the lever being applied against the front lateral face 7B of the trolley.

Moreover, means 20 are provided for immobilizing the receptacles 12 in position on the gripping means 9E of the automatic device 9 during transfer of the containers 8 to the reception position 10. These immobilization means 20 are, in this embodiment, of the electromagnetic type. For that, they are formed for example of two metal plates 20A located on the lateral face 12E of each receptacle 12, opposite the opening 12A, and on the lower face 12B of each of them, the assembly of these four plates 20A being able to cooperate with four metal plates 20B located in correspondence on the bearing surfaces $9E_1$ and $9E_2$ of the gripping means, as shown particularly in FIG. 3.

Figure 6:
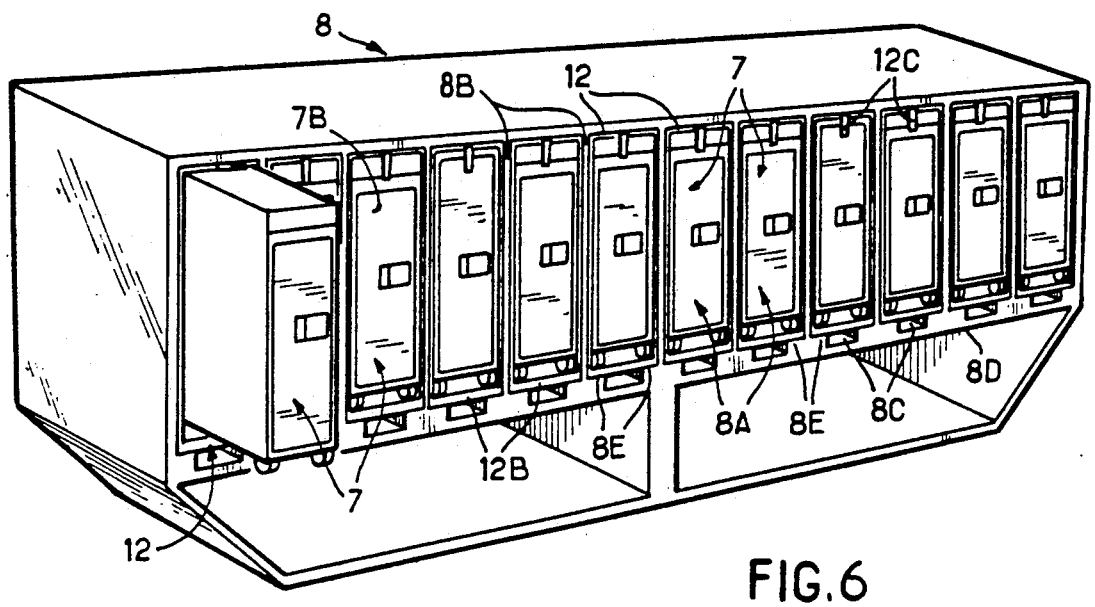
FIGS. 6 and 7 are respectively front and rear perspective views of one of the storage containers in the compartments of which receptacles containing said trolleys are received.
Figure 7:
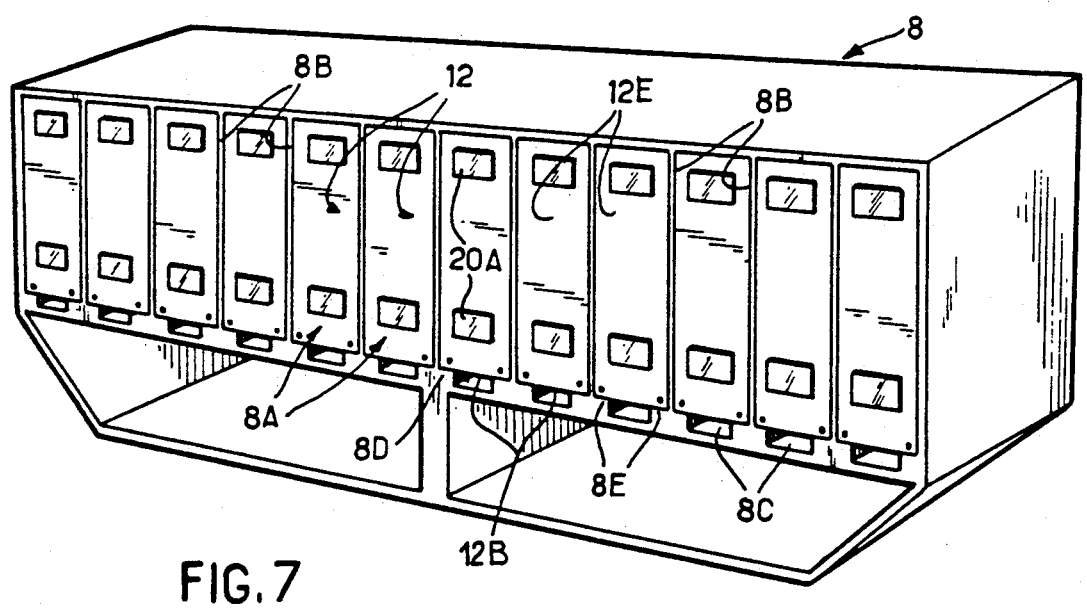

Referring to FIGS. 6 and 7, each container 8 is provided with a plurality of compartments 8A which are separated by transverse dividing walls 8B. In each of these compartments 8A is received a receptacle 12 in which a trolley 7 is arranged. The dimensions of these compartments 8A correspond substantially to those of said receptacles 12. The arrangement of the latter in the storage compartments of the containers 8 is such that the rear lateral face 12E of each of them, carrying the metal plates 20A, faces the container 14 carrying the automatic device 9 Removal of the receptacles from their compartments by the automatic device takes place in a direction parallel to the axis X—X or to the longitudinal axis 2A of the aircraft, as can be seen more particularly in FIG. 15A.

Furthermore, a U shaped recess 8C is formed in the base 8D of each compartment 8A of containers 8, on which the lower face 12B of receptacle 12 rests. This recess 8C makes it possible to insert the bearing surface $9E_1$ of the gripping means under the lower face 12B of the receptacle. Each receptacle 12 rests consequently on two parallel edges 8E of the base 8D, separated by the recess 8C.

Figure 8:
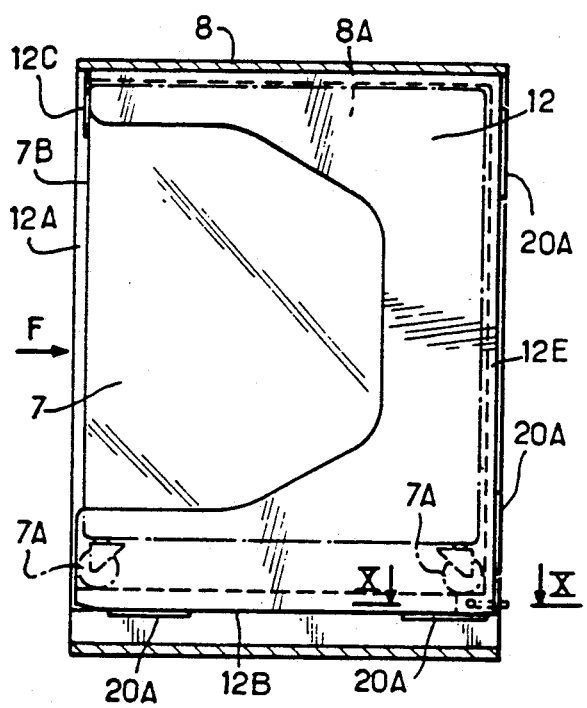
FIG. 8 shows a sectional view of one of the compartments of a container, in which the trolley-carrying receptacle is received.
Figure 9:
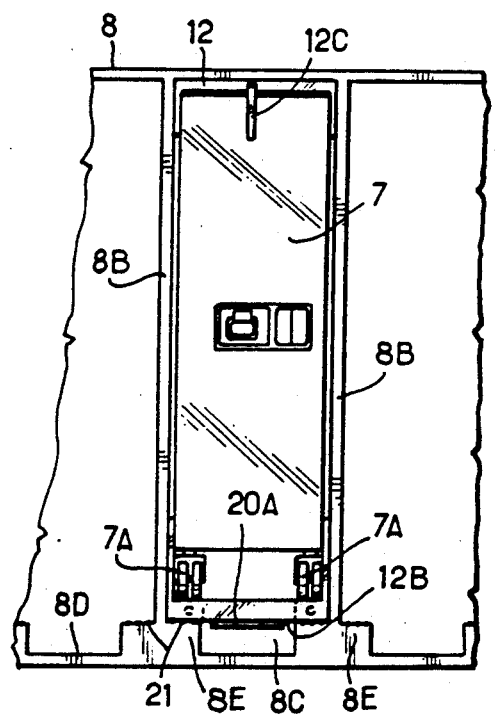
FIG. 9 is a view of the receptacle as shown by arrow F in FIG. 8.
Figure 10:
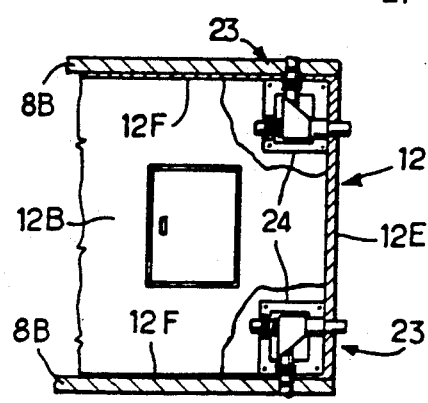
FIG. 10 is a sectional view through line X—X of FIG. 8, showing the immobilization of the trolley-carrying receptacle in the corresponding compartment of the container by locking means.

The arrangement of a receptacle 12 containing a trolley 7 in one of the compartments 8A is shown more particularly in FIGS. 8 to 10. Trolley 7 is immobilized in receptacle 12 by means of the lever mechanism 12C, whereas, to facilitate removal from or insertion of the receptacles in said compartments 8A, running tracks such for example as roller circulation shoes 21, shown schematically, are connected to the edges 8E of each compartment. Thus, the receptacles 12, resting by their lower faces 12B on shoes 21, slide easily.

Furthermore, each of receptacles 12 is immobilized in its corresponding compartment 8A by locking means 23 which are illustrated more particularly in FIGS. 10 to 13.

These locking means 23 are provided, in this embodiment, at two corners of the lower face 12B of each receptacle, opposite opening 12A, and they comprise for each corner a box 24 fixed by screws 24A to the lower face 12B of each receptacle. Inside box 24 is arranged a mechanism with two movable rods 25 and 26 cooperating perpendicularly with each other and disposed in a plane parallel to the lower face 12B.

Figure 11:
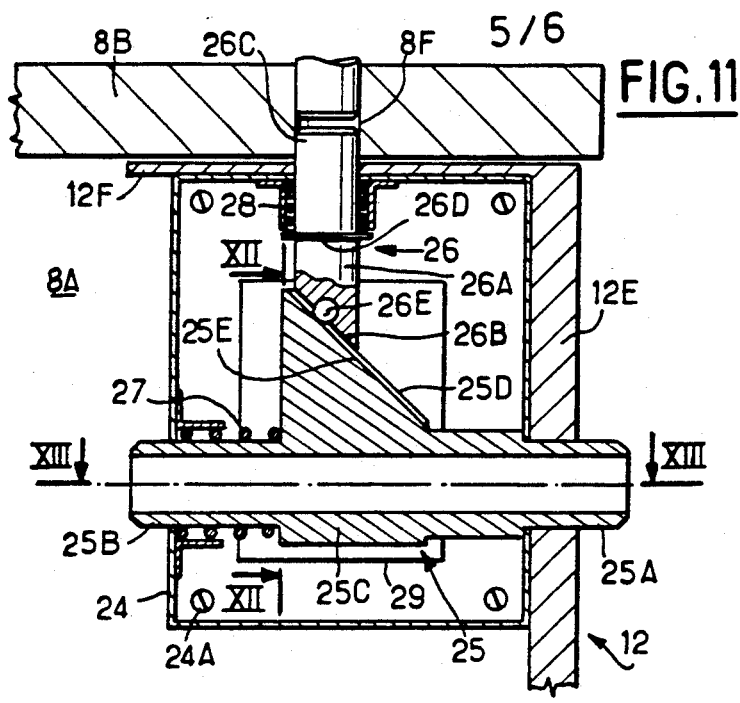
FIG. 11 is an enlarged view of the locking means illustrated in FIG. 10, FIGS. 12 and 13 are respectively sectional views of the locking means through lines XII—XII and XIII—XIII of FIG. 11.
Figure 12:
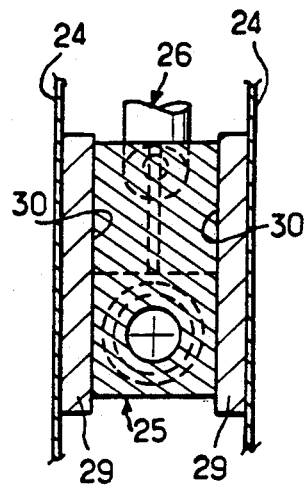
Figure 13:
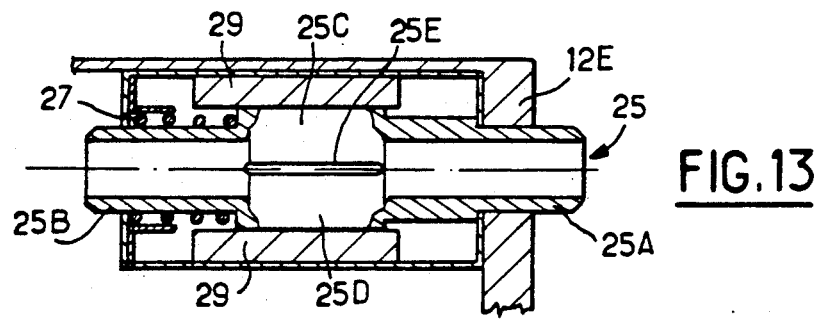

Referring more particularly to FIGS. 11 to 13, one 25A of the ends of the rod 25 of the mechanism projects perpendicularly from the lateral face 12E of the receptacle, turned towards the automatic device. The other end 25B is carried by box 24, whereas the median part 25C of the rod has an inclined ramp 25D with which one of the ends 26A of rod 26 cooperates, whose face 26B is bevelled. The other end 26C of rod 26 passes through the box and the corresponding lateral face 12F of the receptacle and is engaged in a bore 8F formed in the dividing wall 8B separating the two adjacent compartments 8A of container 8.

A spring 27 surrounds the end 25B of rod 25 while bearing against box 24 and the median part 25C of rod 25, whereas another spring 28 surrounds rod 26 and bears against the box and the shoulder 26D provided on rod 26.

Moreover, a groove 25E is formed in ramp 25D of rod 25 with which a ball 26E cooperates which is connected to the bevelled face 26B of the end 26A of rod 26. In addition, in order to maintain the two rods in cooperation, two plates 29 are provided situated respectively on each side of ramp 25D and connected to box 24. Two flats 30 are formed on the median part 25C of rod 25 with which plates 29 cooperate thus preventing rotation of rod 25.

These FIGS. 11 to 13 show the locking means 23 immobilizing the corresponding receptacle 12 in the compartment 8A of one of the containers 8.

The operation of the system according to the invention will be more particularly described with reference to FIGS. 15A to 15C.

Figure 15A:
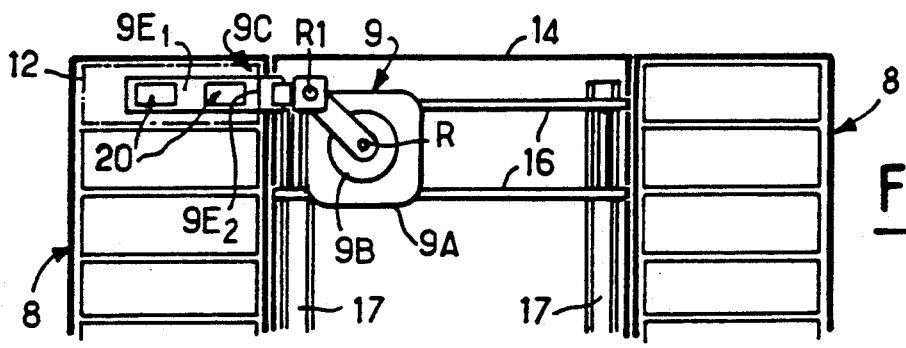
FIGS. 15A, 15B and 15C show the different operating steps of said system from the taking of one of the trolley-carrying receptacles from said container by the automatic device until it is transferred to said enclosure.
Figure 15B:
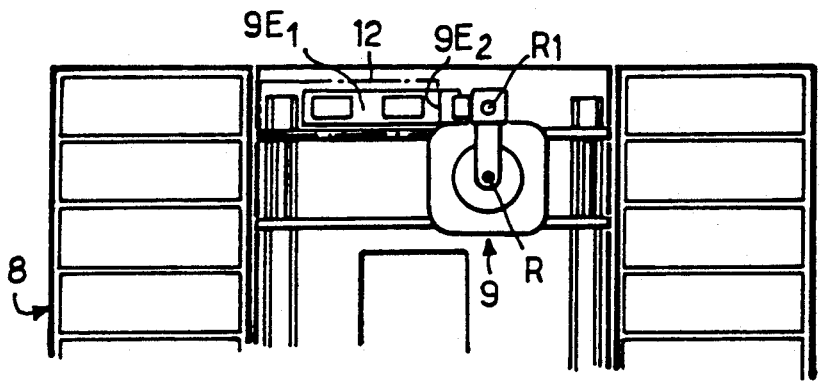

It is assumed that the aircrew desires trolley 7 which contains for example a specific type of meal tray and which is arranged in receptacle 12 located in FIG. 15A at the extreme right of the front container 8 with respect to the longitudinal axis of the aircraft.

Before starting the operating cycle of the automatic device 9, the aircrew makes sure, particularly by means of indicator lights provided on the control unit 13, that the automatic device occupies its initial position, corresponding for example to that in which the gripping means are vertically above passage 11, and the access door 15 at the position is closed.

Figure 14:
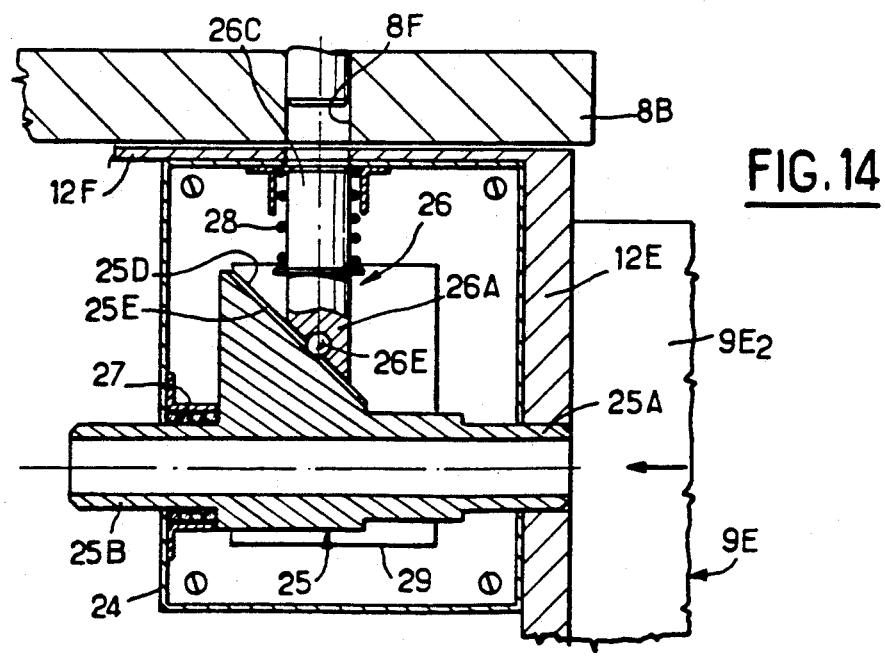
FIG. 14 is a view similar to FIG. 11 showing the retraction of the means for locking the receptacle to said container, under the action of said automatic device.

Then, after the information corresponding to the position of the desired trolley and its contents has been entered into the unit by the keyboard of the microcomputer, the automatic device moves over the guide rails 16 and 17 to take up the configuration illustrated in FIG. 15A. At this moment, the bearing surface $9E_1$ of the gripping means engages in recess 8C provided in the base 8D of container 8, until the bearing surface $9E_2$ of the automatic device enters into contact with the lateral face 12E of the receptacle to be taken 12. Referring to FIG. 14, the bearing surface 9E₂ then acts on the locking means 23 and pushes the ends 25A of rods 25 projecting from the lateral face 12E into the boxes 24 while compressing springs 27. Simultaneously, the ramp 25D of each rod 25 moves back so that, under the action of the 26D of said rods 26 sliding respectively in the grooves 25E of the ramps. The ends 26C of rods 26 are then released from bores 8F formed in the dividing walls 8B defining the compartment 8A. The position of the locking means 23, releasing the receptacle 12 from its compartment 8 under the action of the bearing surface 9E₂ of the gripping means, is shown in FIG. 14.

When the two bearing surfaces 9E₁ and 9E₂ are respectively in contact with the lower 12B and lateral 12E faces of receptacle 12, the electromagnets formed by the metal plates 20A of the receptacle and 20B of the automatic device face each other and are actuated, which locks the receptacle 12 on bearing surfaces 9E₁ and 9E₂ of the automatic device. The operating cycle of the automatic device 9 continues.

By rotational movements of the lifting device 9C about axis R1 and of bracket 9B about axis R and, by movements of the base 9A of the automatic device 9 via the guide rails 16 and 17 along axes X—X and Y—Y, the automatic device 9 (FIGS. 15B and 15C) penetrates under the passage 11 separating the baggage compartment 4 from the reception position 10.

Figure 15C:
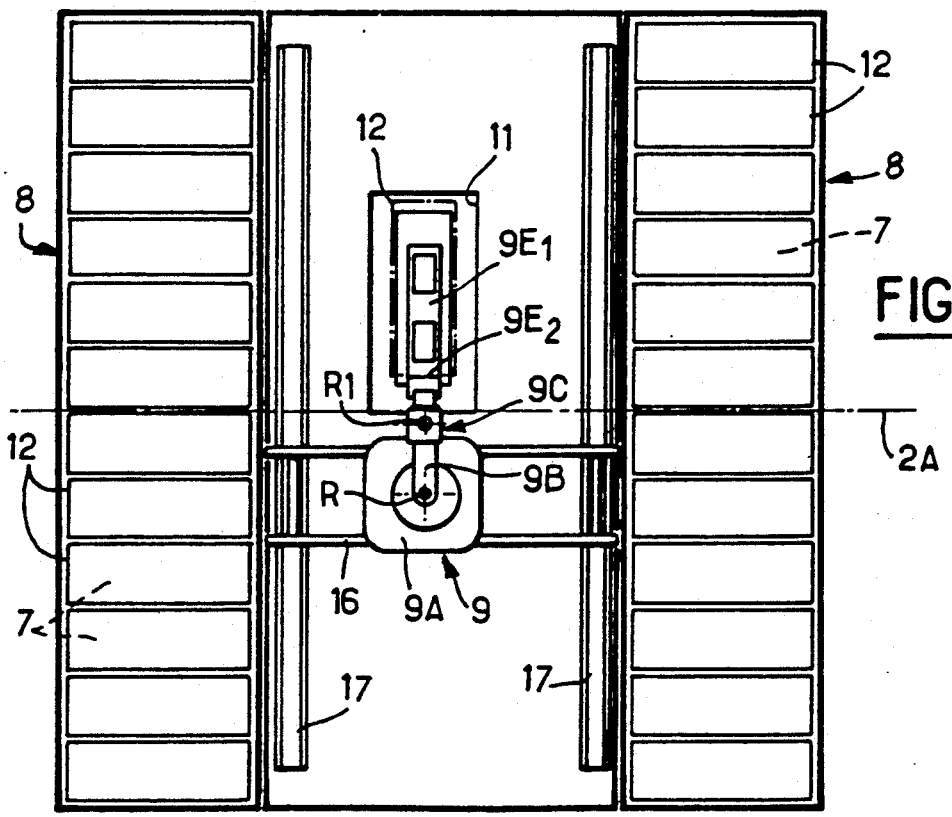

In FIG. 15C, it can be seen that receptacle 12, carried and immobilized on the bearing surfaces 9E₁ and 9E₂ of the automatic device 9, is vertically above passage 11. The position of the automatic device 9, at this moment of its cycle, corresponds also to that shown with a chain-dotted line in FIG. 2. Then, the mobile part 9E of the lifting device 9C is actuated and causes receptacle 12 to move along axis Z—Z, which is thus hoisted to the reception position 10 of the galley 6, after swinging trap 11A of passage 11.

When receptacle 12 is located in position 10, as shown in FIG. 1, a sound and/or light signal warns the aircrew who, by opening the access door 15 of position 10 and swinging lever 12C of the receptacle, may remove trolley 7 and distribute the meal trays.

Receptacle 12 may remain while waiting in the position 10 until trolley 7, then empty, is re-inserted into the receptacle, or be sent directly to its storage compartment by the automatic device.

What is claimed is:

1. A system for supplying an enclosure with trolleys, said enclosure being provided in the passenger cabin of an aircraft and the trolleys being disposed in the baggage compartment of said aircraft and said system comprising:
    means for moving said trolleys, arranged in the baggage compartment and capable of bringing each of said trolleys to said enclosure via a passage formed between the baggage compartment and the enclosure, each of said trolleys having a lower face, and
    means for controlling said moving means, wherein said trolleys are arranged in at least one storage container situated in the baggage compartment, said moving means comprise a controllable, movable automatic device which is arranged in a container adjacent the container storing said trolleys, and which is capable of seizing each of said trolleys by gripping means, then bringing it to said enclosure, said passage connected to the container carrying the controllable, movable automatic device, and said control means comprise a programmable control unit connected to said controllable, movable automatic device and having, as data therein, the information relative to the position of said trolleys in the container and to the products contained in each of them so that, depending on the information transmitted by said unit, said controllable, movable automatic device moves for seizing said corresponding trolley and bringing it from said baggage compartment to said enclosure, said controllable, movable automatic device being formed of:
    a mount fixed to the base of said container and able to move with respect to the base along two axes X—X and Y—Y perpendicular to each other, said axis X—X being parallel to the longitudinal axis of the aircraft, said mount of the controllable, movable automatic device being mounted on at least a first guide rail, corresponding to the axis X—X and along which the mount can move, said first guide rail being itself mounted for sliding on at least a second guide rail corresponding to the axis Y—Y and fixed to the base of said container,
    a bracket, extending said mount and able to pivot with respect to the mount about an axis of rotation R orthogonal to the plane formed by the axes X—X and Y—Y of the base, as well as to the longitudinal axis of the aircraft, and
    a lifting device, comprising said gripping means and mounted for pivoting about the bracket about an axis of rotation R1, parallel to the axis of rotation R of the bracket, said gripping means being slidable along an axis Z—Z parallel to the axes of rotation R and R1 and orthogonal to the plane formed by the axes X—X and Y—Y.

2. The system as claimed in claim 1 wherein said lifting device of said automatic device, comprises a fixed part mounted for pivoting on the bracket about the axis of rotation R1 and a mobile part corresponding to said gripping means and slidable along the axis Z—Z by lifting means associated with the fixed part and the mobile part.

3. The system as claimed in claim 1 wherein said gripping means comprise at least two orthogonal bearing surfaces forming a dihedron, one of which, disposed parallel to the plane formed by the axes X—X and Y—Y, can come into contact with the lower face of said trolley to be seized and the other of which, parallel to the axis Z—Z and orthogonal to the plan X—X and Y—Y, can be applied against the corresponding lateral face of said trolley.

4. The system as claimed in claim 1 wherein said storage container has a plurality of compartments, for receiving said trolleys and are aligned orthogonal to a vertical plan passing through the longitudinal axis of said aircraft.

5. The system as claimed in claim 4 wherein said trolleys are housed respectively in receptacles, each receptacle which contains a trolley being itself arranged in one of the compartments of said storage container while being able to be withdrawn from said compartment by the gripping means of the automatic device in a direction parallel to the longitudinal axis of the aircraft.

6. The system as claimed in claim 5 wherein said receptacles have a parallelepipedic form corresponding to that of said compartments and each receptacle has a lateral opening through which the corresponding trolley may be inserted or removed.

7. The system as claimed in claim 5 wherein each of said trolleys is immobilized in the corresponding receptacle by a swinging lever mechanism, mounted for pivoting on each receptacle and being applied against the lateral face of said trolley which closes the opening of the receptacle.

8. The system as claimed in claim 5 wherein the base of each compartment on which the receptacle rests has a recess allowing the corresponding bearing surface of said gripping means to be inserted under the lower face of said receptacle.

9. The system as claimed in claim 5 wherein locking means immobilize the receptacle containing the trolley chosen by the gripping means of said automatic device.

10. The system as claimed in claim 5 wherein said locking means are of the electromagnetic type and comprise metal plates fixed to the bearing surfaces of the gripping means and which are able to electromagnetically cooperate with metal plates situated correspondingly on the lower face and on the lateral face of each receptacle, opposite said lateral opening.

11. The system as claimed in claim 5 wherein said receptacles are immobilized respectively in the compartments of said container by releasable locking means.

12. The system as claimed in claim 11 wherein said locking means are associated with the lower face of each receptacle and comprise at least one box with a mechanism with two movable rods adapted to cooperate perpendicularly with each other by means of an inclined ramp located on one of the movable rods, one of the ends of a rod projecting from the lateral face of the receptacle, turned towards said automatic device and opposite the opening, and one of the ends of the other rod being engaged in the dividing wall separating two adjacent compartments while immobilizing said receptacle in the container so that, under the action of the gripping means of the automatic device, the projecting end of said rod penetrates into said box whereas, simultaneously, the end of the other rod, under the section of a return spring, clears itself from the dividing wall thus releasing the receptacle from the corresponding compartment of said container.

13. The system as claimed in claim 5 wherein each receptacle is mounted on running tracks connected to the base of each of the compartments.

14. The system as claimed in claim 1 wherein said programmable control unit comprises a microcomputer situated in the enclosure receiving said trolleys.

* * * * *